Sept. 22, 1953
B. CHANCE
2,652,979
ARRANGEMENT FOR PROVIDING CORRECTIONS
IN GROUND-POSITION-INDICATING SYSTEMS
Filed Aug. 1, 1945
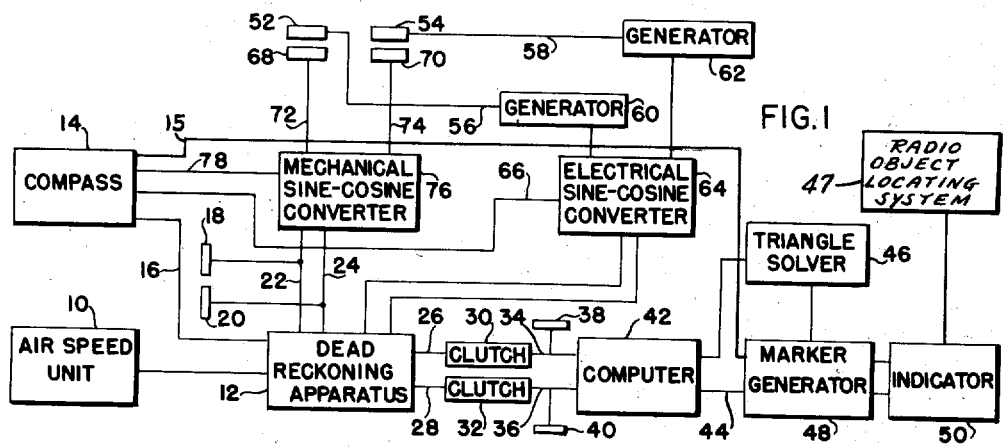
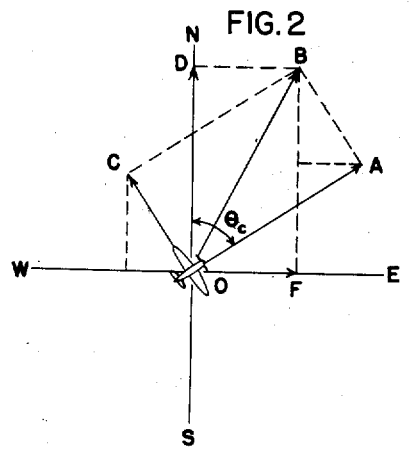
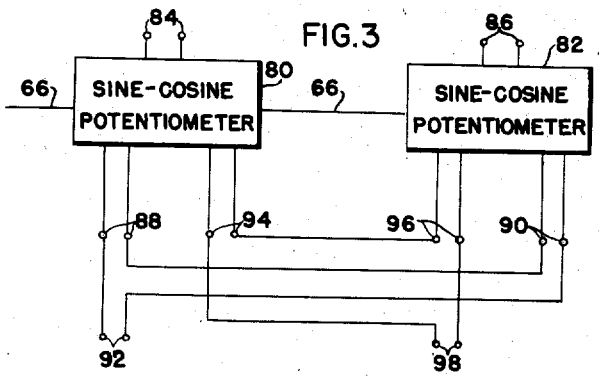
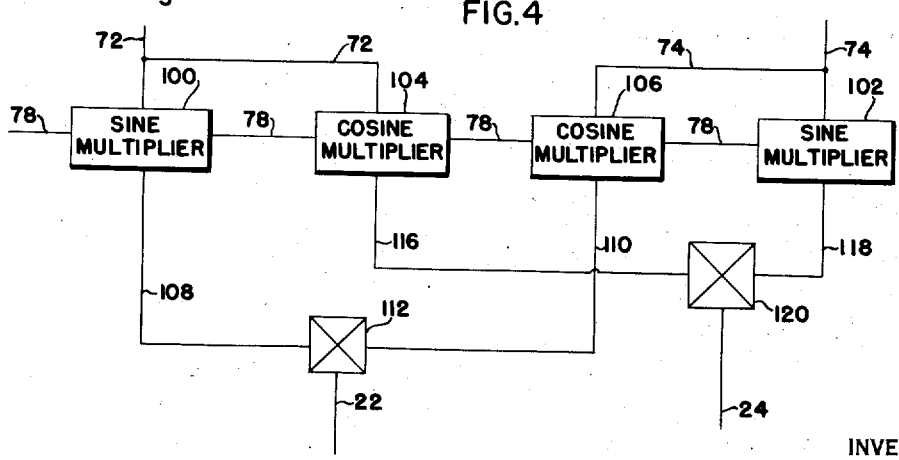
INVENTOR
BRITTON CHANCE
BY
William D. Hall.
ATTORNEY Patented Sept. 22, 1953

2,652,979

UNITED STATES PATENT OFFICE 2,652,979

ARRANGEMENT FOR PROVIDING CORRECTIONS IN GROUND-POSITION-INDICATING SYSTEMS

Britton Chance, Cambridge, Mass., assignor, by mesne assignments, to the United States of America as represented by the Secretary of War Application August 1, 1945, Serial No. 608,318

4 Claims. (Cl. 235—61)

1

This invention relates in general to electrical apparatus and more particularly to a ground position indicator system for aircraft.

One type of navigation system combines dead reckoning means and radio object locating means to continually indicate the position of an aircraft relative to some fixed point on the ground. A ground position indicator system of this type may utilize airspeed and directional information to obtain the components of the airspeed of the aircraft along east-west and north-south axes. These components are combined with the components of wind velocity along the same axes to compute the components of the resultant ground velocity of the aircraft. If the position of some ground point or fix with respect to the aircraft is known at some initial time, then the computed components of the ground velocity may be used to calculate the position of this fix with respect to the aircraft at any future time. The system may then be said to be tracking the fix.

Some method such as a radio object locating system or a radio beacon system may be used to compare the actual and calculated positions of the fix. If these positions differ, the proper corrections may be entered in the form of simultaneous changes in the calculated position and the rate of tracking, so that the calculated position will then continue to coincide with the actual position of the fix. The method of indication in a radio object locating system may be plan position indication (PPI). In this method a cathode ray tube is utilized in which an electron beam is swept across the face of the tube radially from the center to the periphery, and this sweep is rotated about the central point as the directional antenna of the system rotates in azimuth. Radio echoes from points on the ground are used to intensify the sweep trace at points corresponding to their position, and thus an indication is obtained roughly resembling the ground area in the vicinity of the aircraft.

The cathode ray tube sweep may be rotated in such a manner that its angle with respect to some reference direction will be the sum of the heading angle of the aircraft with respect to north, and the angle of the directional antenna with respect to the heading of the aircraft. This will produce a north-stabilized PPI indication, or one in which north has a fixed position on the face of the indicator tube. Alternatively, the sweep may be rotated so that its angle with respect to some reference direction will be equal merely to the angle of the directional antenna with respect to the aircraft heading. It may

2 be seen that in this latter type of presentation, the northern direction on the face of the indicator tube will change as the aircraft changes its direction of heading. The direction of heading is not necessarily the direction of travel due to the effect of the wind. This heading direction will in this case always appear in the same direction on the face of the indicator.

If the actual and computed positions of the fix do not coincide on the indicator, the corrections must be applied to the ground position indicator system in the form of north-south and east-west adjustments. This is relatively simple in the case of a north-stabilized PPI, but it is difficult in the other case, especially if the direction of flight of the aircraft is not known to the operator. Some method is necessary for permitting these corrections to be made with a minimum of difficulty.

It is an object of this invention, therefore, to provide means whereby corrections may be made in a position-indicating system not having a north-stabilized indicator. It is a further object of this invention to provide means for converting these corrections so that they may be used in the production of a proper position indication and tracking rate.

The invention in general contemplates providing means for making corrections in computed position of the fix and rate of tracking along axes parallel to and perpendicular to the heading of the aircraft. These corrections in position and tracking rate are then resolved into components along north-south and east-west axes and applied to the ground position indicating apparatus.

Further objects, features, and advantages of the invention will suggest themselves to those skilled in the art and will become apparent from the following description of the invention taken in connection with the accompanying drawing in which:

Fig. 1 is a block diagram of a system embodying the principles of this invention;

Fig. 2 is a diagram showing the relations between the various correction factors involved;

Fig. 3 is a block diagram of a possible form of one portion of the circuit of Fig. 1; and Fig. 4 is a block diagram of a possible form of a second portion of the circuit of Fig. 1.

Reference is now made to Fig. 1, in which are shown some of the components of a ground position indicator system in conjunction with which the present invention is to be used. A system of the type under consideration is described in the copending application by Britton Chance, Serial No. 598,165, entitled "Electrical Apparatus," filed June 7, 1945. Another such system is described in the copending application by John W. Gray and Ivan A. Greenwood, Serial No. 598,161, entitled "Electrical Apparatus," filed June 7, 1945.

An airspeed unit 10 provides true airspeed information to a dead reckoning apparatus 12. This system may be any device capable of deriving from aircraft air velocity and wind velocity information two shaft rotations respectively proportional in rate to the north-south and east-west components of the ground velocity of the aircraft. Such apparatus is described in the copending application by John W. Gray et al., Serial No. 598,160, entitled "Electrical Apparatus," filed June 7, 1945. Aircraft heading information is transmitted from a compass 14 through shaft 16 to dead reckoning apparatus 12, while the rectangular components of wind velocity are set into the system by wind knobs 18 and 20 connected to shafts 22 and 24 respectively.

The output of dead reckoning apparatus 12 consists of rotations given to shafts 26 and 28, which are coupled through clutches 30 and 32 to shafts 34 and 36 respectively. The latter shafts may be rotated by fix knobs 38 and 40 respectively, and clutches 30 and 32 may be either conventional type friction clutches or magnetic clutches which may be disengaged when knobs 38 and 40 are pressed. The rotation of shafts 34 and 36 are applied to computer 42, which may be any device capable of receiving two shaft rotations proportional respectively to the north-south and east-west components of ground velocity and integrating these motions with respect to time to produce a continual indication in polar coordinates relative to true north of the position of a ground point or fix with respect to the aircraft. An apparatus of this character is described in the copending application by John W. Gray and Duncan MacRae, Jr., Serial No. 598,162, entitled "Electrical Apparatus," filed June 7, 1945.

The output of computer 42 consists of a rotational displacement of shaft 44 and a voltage proportional to the computed ground or horizontal range to the fix. This voltage is fed to triangle solver 46, which produces from it a D.-C. voltage proportional to the slant range from the aircraft to the fix. This triangle solver may be any device capable of producing a slant range voltage when provided with horizontal range and altitude information. Such a device is disclosed in the copending application by Warren G. Proctor, Serial No. 580,020, entitled "Electrical Apparatus," filed February 27, 1945, now Patent No. 2,600,264.

Aircraft heading information is transmitted from compass 14 through shaft 15. The rotational displacement of shafts 15 and 44 and the voltage from triangle solver 46 are applied to marker generator 48, which produces voltage pulses of such a character that when they are applied to indicator 50, a visual indication of computed fix position will appear on the indicator screen. Generators capable of producing such voltage pulses are described in the copending application by Britton Chance, Serial No. 598,165, referred to above.

Radio object locating system 47 is connected to indicator 50 to provide a visual indication of the actual fix position. A radio beacon system may be substituted for radio object locating system 47.

Corrections in position of the markers indicating computed fix position from the actual position are made through parallel displacement knob 52 and perpendicular displacement knob 54. These knobs are mechanically coupled through shafts 56 and 58 to D.-C. generators 60 and 62 respectively. The output voltages from these generators are applied to electrical sine-cosine converter 64, which may consist of a pair of sine-cosine potentiometers. These are potentiometers operating in such a manner that the output voltages from each of them are proportional to the input voltage multiplied by the sine and cosine respectively of the angle through which the rotor is turned. A potentiometer of this type is described in the copending application by Edward F. MacNichol, Jr., Serial No. 598,158, entitled "Electrical Circuit," filed June 7, 1945. The rotors of these potentiometers are turned by shaft 66, which in turn is mechanically coupled to compass 14. The two resulting output voltages from converter 64 are applied as correction voltages to dead reckoning apparatus 12.

Corrections in the tracking rate of the markers indicating computed fix position are made through parallel rate knob 68 and perpendicular rate knob 70. Knobs 68 and 70 are so arranged that they may be "double-gripped" or moved simultaneously through the same angle as are knobs 52 and 54 respectively, by pressing the latter so that they engage the former.

The rotations of knobs 68 and 70 are coupled through shafts 72 and 74 respectively to mechanical sine-cosine converter 76. This converter may consist of a group of devices each capable of producing a shaft rotational displacement which is proportional to the product of the rotational displacement of a first input shaft and either the sine or cosine of the displacement angle of a second input shaft. A device capable of producing this result is described in the copending application by Britton Chance, Serial No. 598,165, referred to above. Compass 14 is connected to converter 76 by shaft 78, and the converter output is coupled to shafts 22 and 24 and through them into dead reckoning system 12.

Reference is now made to Fig. 2 for an explanation of the problem of converting the corrections. A set of axes is shown indicating direction, and the aircraft at point O is assumed to be headed in the direction of vector OA, so that its heading angle with respect to north is $\theta_c$. Assuming that the total correction to be made in the computed position of the fix or in the rate of tracking is represented by vector OB. This vector may be resolved into component vectors OA and OC, respectively parallel to and perpendicular to the direction of heading. Vector OB may also be resolved into north-south and east-west components represented by vectors OD and OF respectively. It is desired to transpose OA and OC into vectors OD and OF so that these latter corrections may be applied to the dead reckoning system.

It can be seen from Fig. 2 and from trigonometric considerations that:

$$OD = OA \cos \theta_c + OC \sin \theta_c \quad (1)$$

and $$OF - OA \sin \theta_c - OC \cos \theta_c \quad (2)$$

for any value of $\theta_c$ from 0 to 360°. If vector OA is opposite in direction from the heading of the air craft, then the sign of each term involving OA will be reversed. Similarly if vector OC is 90° to the right rather than 90° to the left of the aircraft heading, then the sign of each term involving OC will be reversed. Hence OA and OC must be considered to have polarity as well as magnitude.

Reference is now made to Fig. 3, which shows a more detailed diagram of a possible form of electrical sine-cosine converter 64 of Fig. 1, consisting of two sine-cosine potentiometers 80 and 82, of the type to which reference has been made above. The input voltages from D.-C. generators 60 and 62, representative of the vectors OC and OA respectively, are applied to terminals 84 and 86 respectively. The sine output from potentiometer 80, representative of OC sin $\theta_c$ appears at terminals 88 and is connected in series with the cosine output from potentiometer 82, representative of OA cos $\theta_c$, which appears at terminals 90, the combined output, which is representative of vector OD, being connected to terminals 92. The cosine output from potentiometer 80, representative of OC cos $\theta_c$, appears at terminals 94 and is connected in series with the sine output from potentiometers 82, representative of OA sin $\theta_c$, which appears at terminals 96, the combined output, which is representative of vector OF, being connected to terminals 98. These potentiometer connections are made in such a way with regard to polarity that the voltages add or subtract in accordance with the requirements of Equations 1 and 2 above. Shaft 66, shown also in Fig. 1, is used to turn the rotors of both potentiometers.

Reference is now made to Fig. 4, which shows a more detailed diagram of a possible form of mechanical sine-cosine converter 76 of Fig. 1, consisting of two sine multipliers 100 and 102, and two cosine multipliers 104 and 106, of the type referred to above. Shaft 72, shown also in Fig. 1, producing a rotation representative of vector OC, is coupled to sine multiplier 100 and cosine multiplier 104, while shaft 74, producing a rotation representative of OA, is coupled to sine multiplier 102 and cosine multiplier 106. The rotation of shaft 78, representative of $\theta_c$, is coupled into all four multipliers. The output of multiplier 100 is the rotation of shaft 108, which is representative of OC sin $\theta_c$, while that of multiplier 106 is the rotation of shaft 110, which is representative of OA cos $\theta_c$, and these two are combined in differential 112 to produce the rotation of shaft 22, which is representative of vector OD. Similarly the output of multiplier 104 is the rotation of shaft 116, which is representative of OC cos $\theta_c$, and the output of multiplier 102 is the rotation of shaft 118, which is representative of OA$\theta_c$, the two being combined in differential 120 to produce a rotation of shaft 24. Shafts 22 and 24 are also shown in Fig. 1, which is representative of vector OF. The relative directions of the input shaft rotations to differentials 112 and 120 are made such that they add or subtract in accordance with the requirements of Equations 1 and 2.

In the operation of the system, when the aircraft has attained the proper altitude to be maintained for the flight, the known rectangular coordinates of the fix point with respect to the position of the aircraft are set into computer 42 by means of fix knobs 38 and 40, coupled to shafts 34 and 36 respectively. This causes computer 42 to produce an A.-C. voltage proportional to the horizontal range to the fix and a rotation of shaft 44 equal to the azimuth of the fix from the aircraft measured from north. This A.-C. voltage is applied to triangle solver 46, which produces a D.-C. voltage proportional to the slant range to the fix which in turn, along with the rotation of shaft 44, is applied to marker generator 48. The marker generator produces voltages which are applied to indicator 50 to produce a visual marker of fix position on the screen of the indicator, which should coincide with the actual fix indication produced by the echo from the fix. If the coordinates of the fix are unknown but the fix may be recognized on the indicator, then the original setting may be made by merely turning knobs 38 and 40 until the visual marker coincides with the actual fix indication on the screen.

Airspeed unit 10 and compass 14 provide true airspeed and direction of heading information to dead reckoning apparatus 12, while the east-west and north-south components of wind are set in by wind knobs 18 and 20 through shafts 22 and 24 respectively. Shafts 26 and 28 are caused to rotate at speeds proportional respectively to the north-south and east-west components of the ground velocity of the aircraft. These shaft rotations are coupled through clutches 30 and 32 to shafts 34 and 36, and thence to the computer 42. This operation causes computer 42 to change its output so that it continually indicates the position of the fix as the aircraft moves with respect to it. This in turn causes the visual marker of computed fix position to change.

If the information provided to the computer is correct, the visual marker and the actual target indication will continue to coincide on the face of the indicator. If for some reason, as for example an incorrect determination of wind velocity, the rotations of shafts 34 and 36 are incorrect, the marker and fix indication will drift apart on the indicator. This necessitates a change in rate of rotation of shafts 34 and 36 and also a corresponding increment in actual angular displacement, in order to make up the difference in tracking rate and position respectively.

If dead reckoning apparatus 12 is of the type previously referred to, a change in the rates of rotation of shafts 26 and 28 may be accomplished by a rotational displacement of shafts 22 and 24, the same shafts that are coupled to wind knobs 18 and 20. Shaft 22 controls the rate of rotation of shaft 28, which indicates the east-west component of ground velocity, and shaft 24 controls the rate of rotation of shaft 26, which indicates the north-south component of ground velocity. In addition, the two voltages introduced from converter 64 cause north-south and east-west displacements of the marker by giving displacements to shafts 26 and 28 respectively.

In making corrections, knobs 52 and 68 are simultaneously turned through the proper angle to cause the marker and the fix indication to lie on a line perpendicular to the direction of heading as it appears on the face of the indicator. Then knobs 54 and 70 may be simultaneously turned until the marker and indication coincide.

The rotation of knob 68 is transmitted through shaft 72 to multipliers 100 and 104 (as seen in Fig. 4), while the rotation of knob 70 is transmitted through shaft 74 to multipliers 102 and 106. Since shaft 78 is turned through an angle $\theta_c$, the rotation of shaft 108 becomes equal to that of shaft 72 multiplied by the sine of $\theta_c$, while that of shaft 110 becomes equal to that of shaft 74 multiplied by the cosine of $\theta_c$. The rotations of shafts 108 and 110 are combined in differential 112 to produce the resultant rotation of shaft 22. Thus it may be seen that the rotation of shaft 22 is the required magnitude for the east-west correction as stated in Equation 2 given in connection with the explanation of Fig. 2. In a similar manner, the rotation of shaft 24 is made to satisfy the requirements for the magnitude of the north-south correction as stated in Equation 1.

The rotation of knob 52 is transmitted to generator 60 and that of knob 54 is transmitted to generator 62. Generator 60 produces a D.-C. voltage proportional to its speed of rotation which is applied to sine-cosine potentiometer 80 (as seen in Fig. 3), while a similar voltage from D.-C. generator 62 is applied to potentiometer 82. Since shaft 66 is turned to an angle $\theta_c$, the voltage at terminals 88 becomes equal to the input voltage from generator 60 multiplied by the sine of $\theta_c$, while that at terminals 90 becomes equal to the input voltage from generator 62 multiplied by the cosine of $\theta_c$. Since terminals 88 and 90 are connected in series as previously described, the voltage resulting at terminals 92 is seen to be the required magnitude for the east-west correction as set forth in Equation 2. Similarly the voltage at terminals 98 may be shown to be of the proper magnitude for the north-south correction. These voltages are used in dead-reckoning apparatus 12 to produce additional rotational displacement of shafts 26 and 28 to adjust the visual marker to coincide with the fix. Dead-reckoning apparatus 12 is of such a nature that these displacements are of proper magnitude to correspond to the rate changes produced by shafts 22 and 24.

It is obvious that the details of the converters shown in Figs. 3 and 4 may be changed to correspond to different types of dead reckoning systems. Two electrical converters could be used, two mechanical converters, or a combination of both.

It will be further apparent that if A.-C. rather than D.-C. control voltages are used in dead reckoning apparatus 12, a pair of rotary transformers could conveniently be used in place of the potentiometers in electrical sine-cosine converter 64. These transformers may consist of a primary stator coil and a rotor including two secondary coils having axes perpendicular to each other. If the secondary coils are properly oriented, voltages are induced in them which are proportional to the primary voltage multiplied by the sine and cosine respectively of the angle through which the rotor is turned.

While there has been described what is at present considered to be the preferred embodiment of this invention, it will be obvious to those skilled in the art that various changes and modifications may be made therein without departing from the scope of the invention as set forth in the appended claims.

The invention claimed is:

1. In a continuous ground-position-indicating system for a moving object which includes indicating means stabilized with respect to the heading of said moving object for indicating the actual position of a fixed object relative to said moving object, a device for obtaining the heading of said moving object relative to north, a device for obtaining the speed of said moving object, first means coupled to said speed- and heading-indicating devices for obtaining the north-south and east-west components of the velocity of said moving object and for respectively integrating said velocity components, second means coupled to said first means for adding initial north-south and east-west components of said fixed object to the north-south and east-west integrated velocity components, and third means coupled to said first means and including a connection to said heading-indicating device for computing the position of said fixed object with respect to the heading of said moving object, said third means being coupled to said indicating means for comparing the computed and actual positions of said fixed object relative to said moving object; the arrangement for correcting any displacement of said computed position from said actual position comprising first and second adjusting means for correcting the computed position of said fixed object in directions parallel and perpendicular respectively to the heading of said moving object, first converting means coupled between each of said adjusting means and said velocity indication producing means for controlling the relative magnitudes of said indications of north-south and east-west velocity components, second converting means coupled between each of said adjusting means and said velocity indication producing means for controlling the absolute magnitudes of said indications of north-south and east-west velocity components, each of said converting means including a pair of sine multipliers and a pair of cosine multipliers for converting the corrections made along directions parallel and perpendicular to the heading of said object into corrections along the north-south and east-west directions.

2. A system for continuously indicating the position of a fixed object relative to a moving object, said system comprising: an indicator on said moving object; first means for obtaining on said indicator a continuous indication, stabilized relative to the heading of said moving object, of the actual position of said fixed object; second means, including means for measuring the heading velocity component of said moving object and means for introducing the estimated drift velocity component of said moving object, to obtain on said indicator a continuous indication, stabilized relative to the heading of said moving object, of the position of said fixed object computed as a function of the heading of said moving object, relative to a given direction, and the integrated resultant velocity of said moving object over elapsed time, any difference between said resultant velocity and the true velocity of said moving object causing an error between the actual and computed indicated positions of said fixed object; and third means coupled to said second means for correcting said error and simultaneously providing a correction factor for said estimated drift velocity to prevent any future error from being introduced.

3. A system in accordance with claim 2, wherein said second means includes compass means for measuring the heading of said moving object relative to north, dead-reckoning means coupled to said heading velocity means and said compass means, said means for introducing the estimated drift velocity component introducing the north-south and east-west components respectively of drift velocity to said dead-reckoning means, said dead-reckoning means producing an output proportional respectively to the integrated north-south and east-west components of the velocity of said moving object, means coupled to the output of said dead-reckoning means for adding respectively the north-south and east-west components of the position of said fixed object, at an initial point, to the north-south and east-west integrated velocity components, polar coordinate converting means coupled to said last-named means and to said compass means for providing a signal representative of the position of said fixed object, stabilized relative to said heading, and means for applying said signal to said indicator.

4. A system in accordance with claim 3, wherein said third means include means coupled to said compass means for deriving respectively the north-south and east-west components of the error between said actual and computed positions of said fixed object, means for applying said position error components to said dead-reckoning means, means coupled to said compass means for deriving respectively the north-south and east-west components of the rate of change of the error between said actual and computed positions of said fixed object, and means for applying the components of said rate of change of the error to said dead-reckoning means.

BRITTON CHANCE.

References Cited in the file of this patent

UNITED STATES PATENTS

| Number | Name | Date |
|---|---|---|
| 1,864,576 | Bauersfeld | June 28, 1932 |

FOREIGN PATENTS

| Number | Country | Date |
|---|---|---|
| 201,663 | Switzerland | Mar. 1, 1939 |
| 520,228 | Great Britain | Apr. 18, 1940 |